United States Patent
Behl et al.

(10) Patent No.: US 9,143,378 B2
(45) Date of Patent: Sep. 22, 2015

(54) RENDERING COMPONENTS WITHIN DIFFERENT BROWSER ENVIRONMENTS

(75) Inventors: Stefan Behl, Holzgerlingen (DE); Stefan Koch, Stuttgart (DE); Carsten Leue, Sindelfingen (DE); Juergen Schaeck, Achern (DE); Thomas Stober, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 667 days.

(21) Appl. No.: 13/451,732

(22) Filed: Apr. 20, 2012

(65) Prior Publication Data

US 2013/0007107 A1    Jan. 3, 2013

(30) Foreign Application Priority Data

Jul. 1, 2011 (EP) .................. 11172326

(51) Int. Cl.
| | |
|---|---|
| *G06F 15/173* | (2006.01) |
| *G06F 15/16* | (2006.01) |
| *G06F 17/00* | (2006.01) |
| *H04L 29/00* | (2006.01) |
| *G06F 17/30* | (2006.01) |
| *G06F 9/44* | (2006.01) |

(52) U.S. Cl.
CPC .............. *H04L 29/00* (2013.01); *G06F 9/4443* (2013.01); *G06F 17/30861* (2013.01); *G06F 17/30905* (2013.01)

(58) Field of Classification Search
CPC ........................ G06F 17/30905; G06F 17/3089
USPC ......................... 709/224, 228; 715/234, 239
See application file for complete search history.

(56) References Cited

U.S. PATENT DOCUMENTS

| | | | | |
|---|---|---|---|---|
| 6,412,008 | B1 * | 6/2002 | Fields et al. | 709/228 |
| 7,685,603 | B2 | 3/2010 | Singler et al. | |
| 8,849,985 | B1 * | 9/2014 | Colton et al. | 709/224 |
| 2006/0230344 | A1 * | 10/2006 | Jennings et al. | 715/522 |
| 2008/0235573 | A1 * | 9/2008 | Serdy et al. | 715/239 |
| 2009/0210487 | A1 | 8/2009 | Westerhoff et al. | |
| 2010/0194753 | A1 | 8/2010 | Robotham et al. | |
| 2012/0084350 | A1 * | 4/2012 | Xie | 709/203 |
| 2013/0086255 | A1 * | 4/2013 | Burckart et al. | 709/224 |

* cited by examiner

*Primary Examiner* — Shirley Zhang
(74) *Attorney, Agent, or Firm* — Cantor Colburn LLP; Prentiss Johnson

(57) ABSTRACT

Embodiments of the invention relate to rendering components within different browser environments. A request for a portal page is received from a client system. The portal page is aggregated by a computer and a renderer is selected based on a client system browser specific environment. A browser specific markup, provided by at least one portlet, is transmitted from the renderer to the client system.

12 Claims, 5 Drawing Sheets

RENDERING COMPONENTS WITHIN DIFFERENT BROWSER ENVIRONMENTS

PRIORITY

The present application claims priority to European Application No. 11172326.8, filed Jul. 1, 2011 the contents of which are herein incorporated by reference in its entirety, with all the benefits accruing therefrom under 35 U.S.C. §119.

BACKGROUND

The present invention relates generally to computers, and more specifically, to rendering components within different browser environments.

In general, a rich web user interface involves several, different concepts of rendering web content within a browser. Two of the fundamental concepts are client side aggregation of web pages and server side aggregation of web pages.

Server side aggregation is characterized by having a server performing the aggregation of pages and content into a full page, which is sent to the browser. Any dynamic components are executed on the server side. Typical dynamic components are portlets based on the specification Java Specification Request 286 (JSR286), for example. (Java and all Java-based trademarks and logos are trademarks or registered trademarks of Oracle and/or its affiliates.)

Client side aggregation is characterized by doing the final aggregation of pages and content within the browser itself. The server provides page fragments, page feeds, etc. Dynamic components, such as widgets, are executed on the browser side. Typical components are described in the specifications for iWidgets, Open Social, etc.

These two concepts have different programming models. Having components and pages which support both programming models at the same time is difficult. It is especially hard to optimize both the rendering at the server and the client side while at the same time exploiting each side's best capabilities.

U.S. Pat. No. 7,685,603 B2 "Selecting Client Adapters" by Singler et al., discloses methods and apparatuses, including computer program products, for selecting client adapters. In the disclosed system, a client abstraction layer identifies one or more selection data elements in a client request and selects an adapter to communicate with the client based on the selection data elements. Each selection data element specifies an adapter type, a client type, or data describing the client. The adapter may be selected based on a multi-stage selection process that involves performing an adapter-request process for selecting an adapter based on the selection data elements that specify the adapter type. If the adapter-request process fails to select an adapter, then a client-identification process for selecting an adapter based on the selection data elements that specify the client type is performed. If the client-identification process fails to select an adapter, a client-description process for selecting an adapter based on the selection data elements that specify data describing the client is performed.

SUMMARY

Embodiments include a method, system, and computer program product for rendering components within different browser environments. A request for a portal page is received from a client system. The portal page is aggregated by a computer and a renderer is selected based on a client system browser specific environment. A browser specific markup, provided by at least one portlet, is transmitted from the renderer to the client system.

The above embodiments, as well as additional purposes, features, and advantages of the present invention will become apparent in the following detailed written description.

BRIEF DESCRIPTION OF THE SEVERAL VIEWS OF THE DRAWINGS

Embodiments of the present invention, as described in detail below, are shown in the drawings, in which.

DETAILED DESCRIPTION

Figure 1:
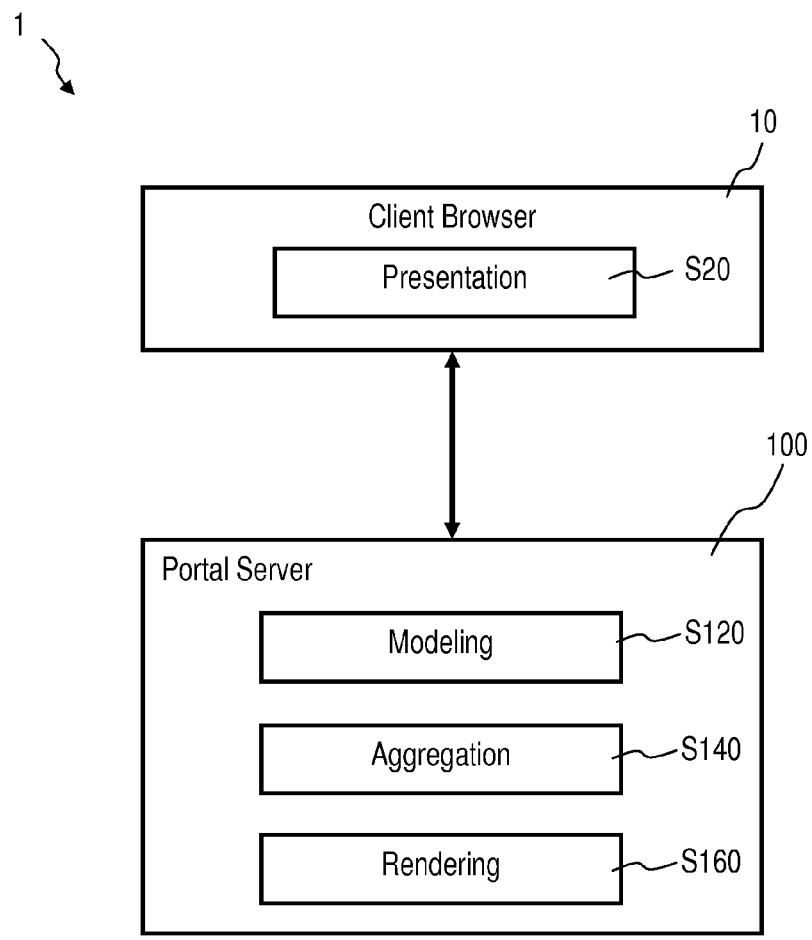
FIG. 1 is a schematic block diagram of a client server environment in an embodiment.
Figure 2:
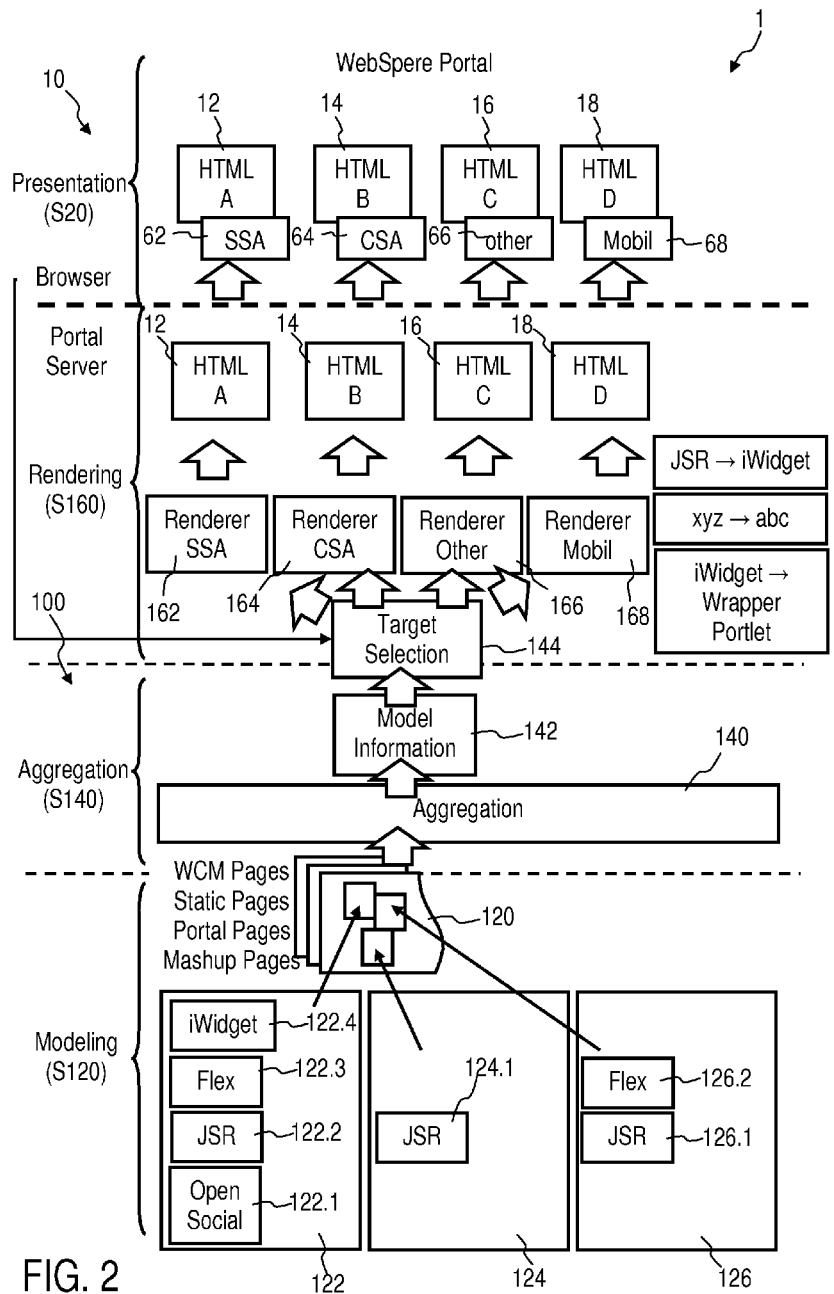
FIG. 2 is a more detailed block diagram of the client server environment shown in FIG. 1, in an embodiment.
Figure 3:
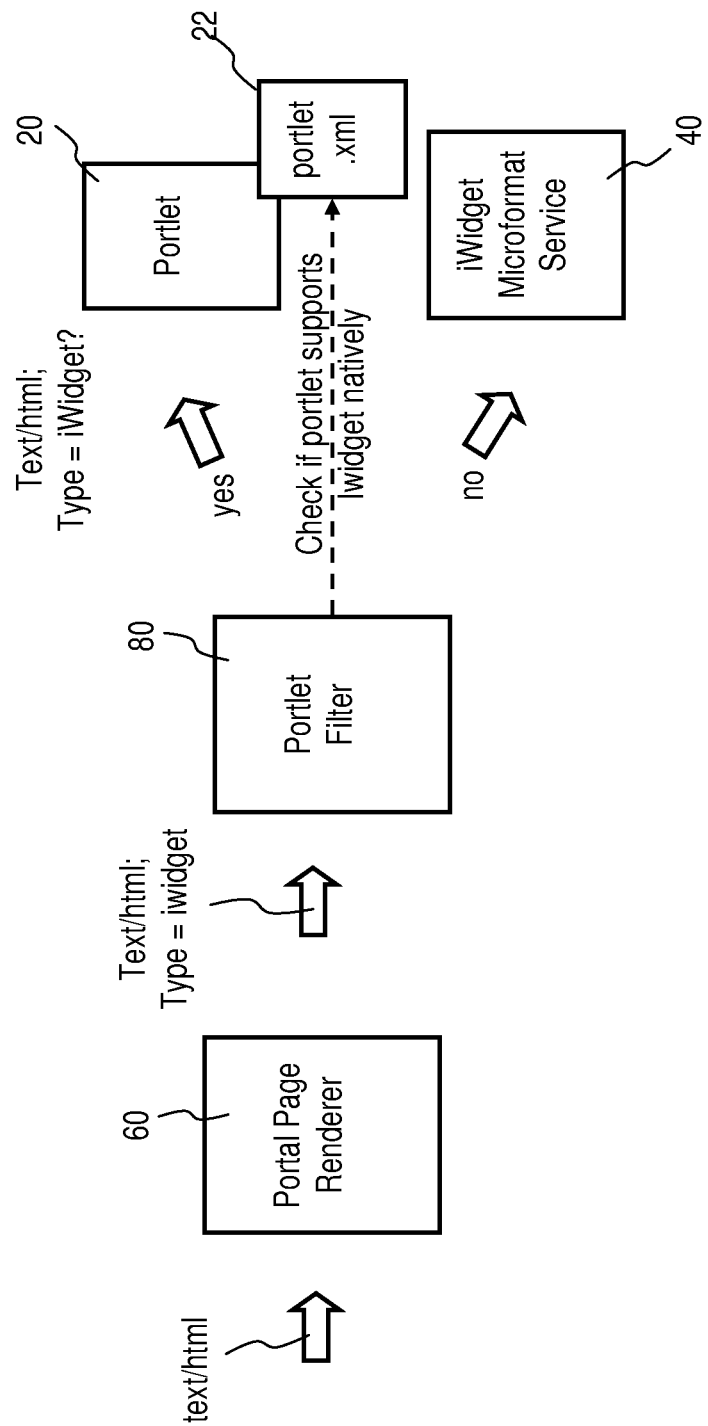
FIG. 3 is a schematic block diagram of a decision process of the client server environment shown in FIGS. 1 and 2, in an embodiment.

FIGS. 1 and 2 each show a client server environment 1 in accordance with an embodiment, and FIG. 3 shows a decision process of the client server environment 1 shown in FIGS. 1 and 2 in accordance with an embodiment.

FIGS. 1, 2 and 3, employ a system for rendering components within different browser environments, where each application includes multiple renderers 60, 162, 164, 166, 168, which control communication between a corresponding application and a browser specific runtime. Further, each application includes at least one portlet 20, 122, 124, 126 which provides at least one runtime specific markup 122.1, 122.2, 122.3, 122.4, 124.1, 126.1, 126.2. At runtime, a client browser 10 requests a portal page 12, 14, 16, 18 from a portal server 100, which aggregates the portal page 12, 14, 16, 18, and chooses the appropriate renderer 60, 162, 164, 166, 168 based on a browser specific environment. The chosen renderer 60, 162, 164, 166, 168 delivers a browser specific markup 122.1, 122.2, 122.3, 122.4, 124.1, 126.1, 126.2 which is provided by the at least one portlet 20, 122, 124, 126. The browser environments include at least one of the following runtime environments: hypertext markup language (HTML), Open Social®, iWidgets®, and Flex, for example. The runtime specific markup includes at least one of the following markups: HTML, JavaScript, extensible markup language (XML), Flex, for example.

In the embodiment of FIG. 2, the client browser 10 requests one of the portal pages 12, 14, 16, 18 by sending a request, (e.g. a hypertext transfer protocol (HTTP) get request) to the portal server 100. The requested portal page (i.e., one of the portal pages 12, 14, 16, 18) is addressed via a uniform resource locator (URL). Upon receiving the request, the portal server 100 decodes the incoming URL to determine which of the portal pages 12, 14, 16, 18 is to be rendered.

Before starting the modeling process S120, the portal framework of the portal server 100 determines the render mode of the selected portal page using a target selection module 144. This decision is made based on the capabilities of the client browser 10 and model information 142 that includes metadata of the requested portal page.

The selected render mode (i.e., one of the render modes 62, 64, 66, 68) of the requested portal page is determined by inspecting the metadata that is associated with the requested portal page. The page metadata is one or more parameters that are stored in a portal database. One parameter of the metadata specifies the proper render mode of the requested portal page. The selected render mode is set by a portal administrator when the portal page requested portal page is created.

The capabilities of the client browser 10 are analyzed to check if the selected render mode may be used. In order to determine the capabilities of the client browsers' 10, the client browser 10 is identified. This is done by inspecting a user-agent header, which is sent together with a HTTP get request, (e.g., "User-Agent: Mozilla/4.0/compatible; MSIE 7.0; Windows NT 5.1; Trident/4.0; .NET CLR 2.0. 50727; .NET CLR 3.0.4506.2152; .NET CLR 3.5.30729").

The concrete capabilities of the client browser 10 are looked up in the portal database. If the selected render mode is client-side aggregation (CSA), the client should be a modern web-browser which supports JavaScript and fulfills the JavaScript performance requirements that are required to support a highly dynamic web page (e.g., web 2.0 code compatible). If the client capabilities are not sufficient to support a highly dynamic web page, the portal server page renderer applies server-side aggregation (SSA).

After determining the render mode, the respective portal page renderer (i.e., one of the portal page renderers 60, 162, 164, 166, 168) is executed to initiate the rendering of the requested portal page during the rendering process S160. For client-side aggregation rendering, the page renderer is executed and produces a page skeleton markup that contains sections which are filled by the client browser 10 through separate requests. For server-side aggregation, the page renderer produces a complete markup representation of the requested portal page which includes the markup 122.1, 122.2, 122.3, 122.4, 124.1, 126.1, 126.2 of all portlets 20, 122, 124, 126 of the requested portal page. A corresponding page model 120 is created during a modeling process S120.

On the portal server 100, all of the page components are represented as portlets 20, 122, 124, 126. How the portlets 20, 122, 124, 126 are rendered is determined by the portal framework and the selected portlet. The portlets 20, 122, 124, 126 may influence the rendering decision by providing an artifact that is optimized for the respective client-side component runtime. For a SSA, the selected portal page is aggregated and rendered on the portal server 100, during the aggregation process S140 and the rendering process S160. Accordingly, the page rendering process S160 directly invokes the portlets 20, 122, 124, 126 to request their markup 122.1, 122.2, 122.3, 122.4, 124.1, 126.1, 126.2. For a CSA, the portal framework checks if the portlets 20, 122, 124, 126 provide an optimized and/or native implementation that may be directly executed in the client-side component runtime. For example, if an iWidget runtime is present on the client browser 10, the portal framework checks to see if the selected portlet provides a native iWidget implementation. If it does, the iWidget of the selected portlet is returned.

FIG. 3 depicts an embodiment that includes a portlet 20 may support multiple client-side component runtimes. Each client-side component runtime is uniquely identified via a special mime type. In case of iWidgets®, the portlet 20 may declare the iWidget-specific mime type "text/html; type=iwidget;version=2.0" in its deployment descriptor 22 (e.g., a portlet.xml file), for example.

During the rendering S160, the portlet 20 may determine, based on, for example, the Java portlet API, if an iWidget is requested or not (PortletRequest#getResponseContentType( ). If the iWidget mime type is requested, the portlet 20 produces a markup that includes iWidget-specific microformats which are understood by the iWidget runtime that resides in the client browser 10.

The decision about the concrete mime type is made by the portal page renderer 60 that has been selected by the portal framework based on the capabilities of the client runtime (i.e., the CSA). If the client runtime only supports iWidgets, the portal page renderer 60 of FIG. 3 requests the portlet markup for the iWidget mime type.

In an embodiment, this process is realized using a portlet filter 80, which is executed in front of each portlet 20. The portlet filter 80 is responsible for checking to see if the portlet 20 natively supports the iWidget runtime by inspecting its deployment descriptor 22. If the portlet 20 provides its own iWidget implementation, the portlet filter 80 calls the portlet 20 directly and passes the iWidget mime type to the portlet 20. If not, the portlet 20 will be directly wrapped into an iWidget by invoking an iWidget microformat service 40. The latter approach is realized using a web services for remote portlets (WSRP) based portlet iWidget wrapper, for example, and is discussed below with regard to FIG. 5.

Figure 4:
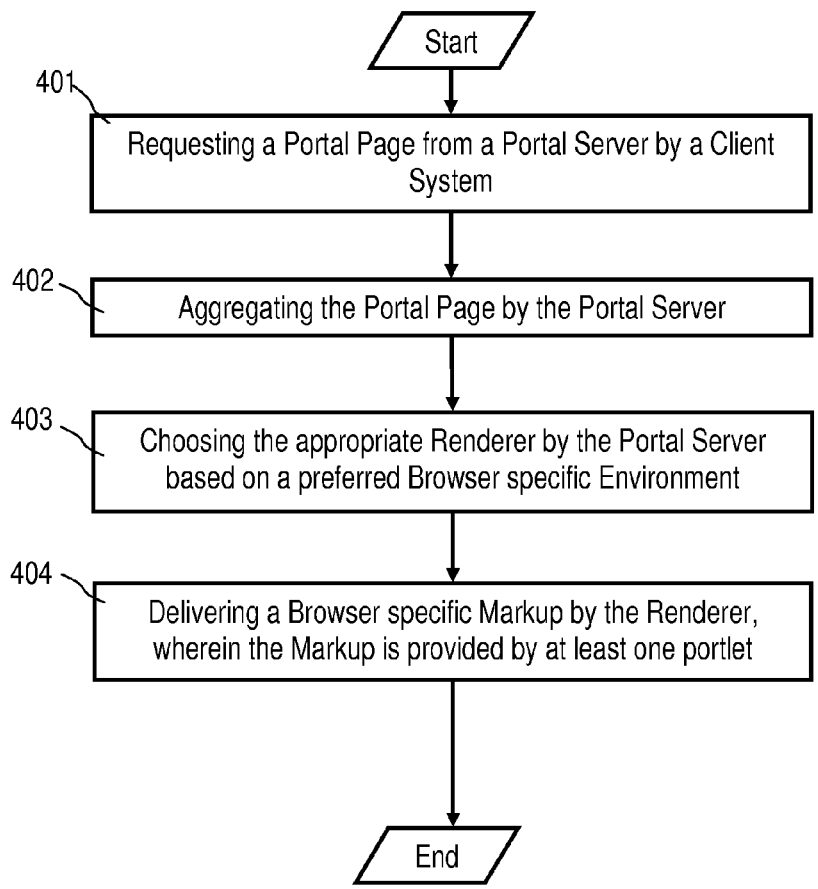
FIG. 4 is a schematic flow diagram of a method for rendering components within different browser environments in an embodiment.

FIG. 4 shows a method for rendering components within different browser environments, in accordance with an embodiment.

At block 401, one of the portal pages 12, 14, 16, 18 is requested from the portal server 100 by the client browser 10. At block 402, the requested portal page is aggregated by the portal server 100. At block 403, the portal server 100 chooses an appropriate renderer from the portal renders 60, 162, 164, 166, 168 based on a browser specific environment. At block 404, the chosen renderer delivers one of the browser specific markups 122.1, 122.2, 122.3, 122.4, 124.1, 126.1, 126.2 which is provided by the at least one portlet 20, 20.1, 20.2, 122, 124, 126.

Figure 5:
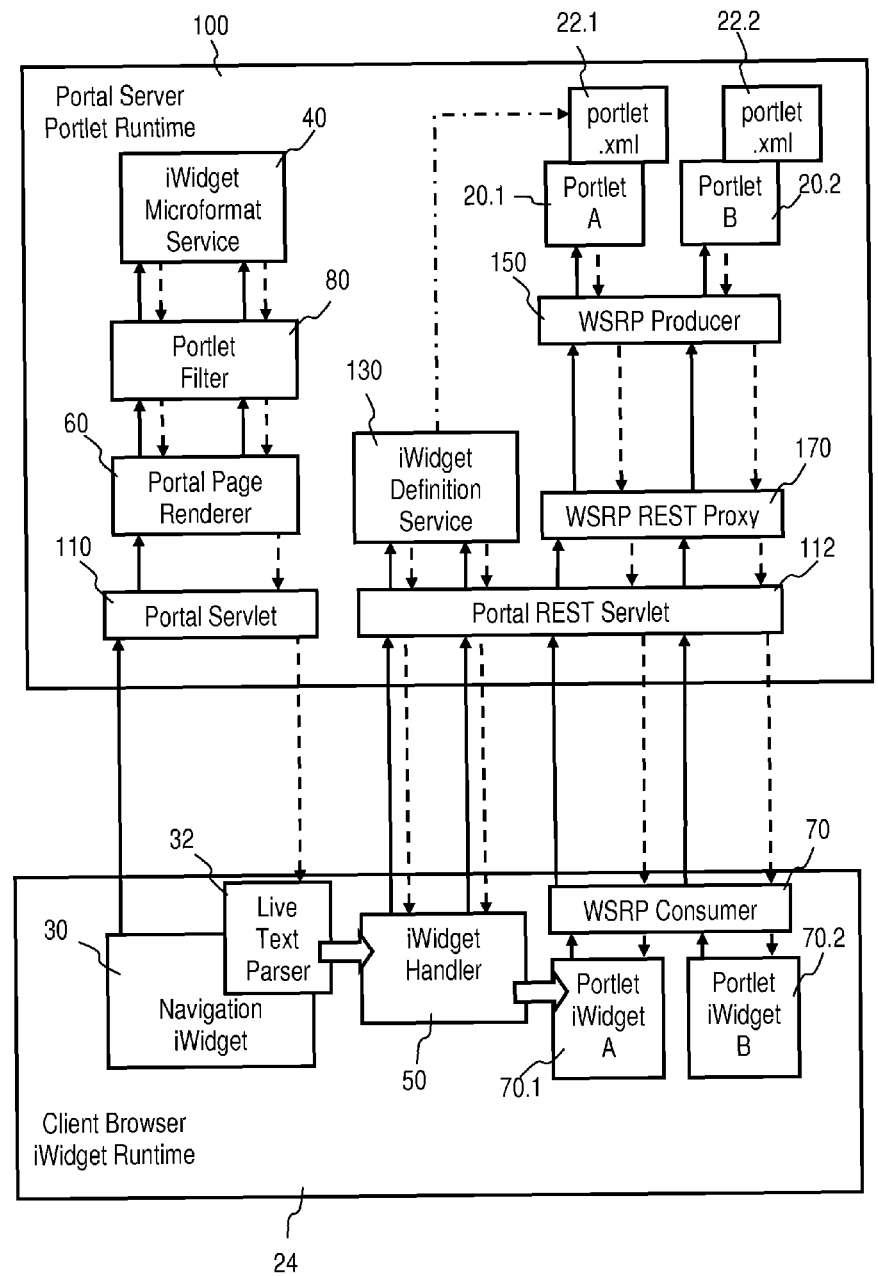
FIG. 5 is a more detailed block diagram of a portlet rendering process in a client-side aggregation in an embodiment.

FIG. 5 is a more detailed block diagram of a portlet rendering process in CSA, in accordance with an embodiment.

In an embodiment, a user navigates to a portal page, for example to a portal page P with two portlets on it, a portlet A 20.1 and a portlet B 20.2. Upon receiving the navigation event triggered by the user, a navigation iWidget 30 sends an HTTP get request to the portal server 100 to get a markup representation of the portal page P.

Upon receiving the incoming request by a portal servlet 110, the portal server 100 invokes the page renderer 60 which is responsible for aggregating the page markup. The page renderer 60 requests the markup for portlet A 20.1 and portlet B 20.2 from the portlet runtime. For a CSA page the portlet filter 80 intercepts the markup requests for portlet A 20.1 and B 20.2. Instead of calling the portlets to get their real markup, the portlet filter 80 invokes the iWidget microformat service 40 to produce an HTML microformat as specified in the iWidget specification.

Upon receiving the markup at the client browser 10, a live text parser 32 detects the iWidget microformats in the markup of the portal page P and invokes the registered handler that is responsible for processing iWidget microformats (i.e., the iWidget Handler 50).

The iWidget handler 50 instantiates the two iWidgets 70.1 and 70.2 representing portlet A and portlet B respectively and registers them with the client browser iWidget runtime 24. The instantiated iWidgets are called portlet iWidgets because they are used to wrap portlets.

In addition, the iWidget handler 50 initializes the created portlet iWidgets 70.1, 70.2 by requesting their iWidget definition. The URL to request the iWidget definition is part of the iWidget HTML microformat. The iWidget handler 50 sends two HTTP get requests to a portal representational state transfer (REST) servlet 112 to get the iWidget definitions for portlet A 20.1 and B 20.2.

On the portal server 100, the incoming requests are processed by an iWidget definition service 130. The iWidget definition service 130 is responsible for generating an iWidget definition for a given portlet A 20.1, B 20.2. The iWidget definition service 130 generates the iWidget definition by inspecting the portlet deployment descriptor 22.1, 22.2 and mapping the information found to the corresponding iWidget concepts. For example, the portlet event definitions are mapped to corresponding iWidget event definitions, the supported portlet modes are mapped to the corresponding iWidget modes, and the definition of public render parameters are mapped to a corresponding shared item set definition as specified in the iWidget specification. In addition to inspecting the portlet deployment descriptor 22.1, 22.2, the iWidget definition service 130 adds additional information to the iWidget definition. For example, it includes links to all JavaScript resources that are needed to run the iWidget on the client browser 10. The resources that are needed by the portlet iWidget 70.1, 70.2 include a client-side WSRP consumer 70 which is able to communicate with a server-side portlet 20.1, 20.2.

After receiving the iWidget onView event, which is an event triggered when the iWidget is loaded by a browser, the portlet iWidget 70.1, 70.2 calls the Client-side WSRP consumer 70 to request the portlet markup from the portal server 100. The client-side WSRP consumer 70 sends a WSRP getMarkup operation to a WSRP REST proxy 170 which runs on the portal server 100 using an HTTP get request.

The WSRP REST proxy 170 is responsible for translating the incoming REST-based WSRP message received from the client-side WSRP consumer 70 into a corresponding WSRP simple object access protocol (SOAP) message. After translating the incoming request, the WSRP REST proxy 170 forwards the SOAP-based WSRP message to a WSRP producer 150.

The WSRP producer 150 invokes the portlet 20.1, 20.2 to get its markup and creates a WSRP getMarkup response. The response is passed back to the WSRP REST proxy 170. After retrieving the HTTP caching headers from the WSRP getMarkup response, the response is passed back to the client-side WSRP consumer 70.

Upon receiving the WSRP response from the portal server 100, the client-side WSRP consumer 70 interprets the response. For a getMarkup response, the client-side WSRP consumer 70 retrieves the portlet markup from the message, parses the markup for URL rewriting purposes, and passes the processed markup back to the portlet iWidget 70.1, 70.2. The portlet iWidget 70.1, 70.2 injects the portlet markup into a document object model (DOM) that is displayed by the client browser 10. The URL rewriting step mentioned above ensures that any interaction with the portlet (e.g. by clicking on a link) is mapped to an invocation of the client-side WSRP consumer 70.

An embodiment is a method for rendering components within different browser environments, where each application includes multiple renderers, where each renderer controls a communication between a corresponding application and a browser specific runtime, and where each application further includes at least one portlet providing at least one runtime specific markup.

A portal page is requested from a portal server by a client system. The portal page is aggregated by the portal server. The portal server chooses an appropriate renderer based on a browser specific environment, and delivers a browser specific markup which is provided by at least one portlet.

In further embodiments, the portal server communicates with the browser specific environment, negotiates the capabilities that the browser specific environment has available, and determines a proper rendering mode for the requested page to be displayed, based on the capabilities of the browser specific environment.

In further embodiments, the proper rendering mode includes a server side rendering or a client side rendering.

In further embodiments, using server side rendering, the renderer is executed to produce a complete markup representation of the portal page including the markup of all of the portlets. For client side rendering the renderer is executed to produce a page skeleton markup containing sections that are filled by the client system through separate requests.

In another embodiment, in a system for rendering components within different browser environments, a client system requests a portal page from a portal server which aggregates the portal page, and chooses the appropriate renderer based on a browser specific environment. The renderer delivers a browser specific markup which is provided by at least one portlet. Each application includes multiple renderers, and each renderer controls a communication between a corresponding application and a browser specific runtime. Each application further includes at the least one portlet providing at least one runtime specific markup.

In further embodiments, the portal server chooses the render mode of the requested portal page based on the capabilities of the browser specific environment and metadata of the portal page, where the metadata are parameters stored in a portal database which includes a specific set parameter specifying the proper render mode of the portal page, where the capabilities of the browser specific environment are analyzed to check if the proper render mode is executable by the browser specific environment.

In further embodiments, the portal server identifies the browser specific environment by inspecting a user-agent header and looking up the capabilities of the browser specific environment in the portal database. Server-side rendering is used as a fallback if the capabilities of the browser specific environment are not sufficient for client-side rendering.

In further embodiments, if using client side rendering, a portlet filter is executed on the portal server to check if a corresponding portlet natively supports an iWidget runtime. This is performed by inspecting the iWidget deployment descriptor. If the portlet provides its own iWidget implementation, the portlet filter directly calls a corresponding portlet and passes a corresponding mime type to the portlet, otherwise the portlet filter invokes an iWidget microformat service to directly wrap the portlet in an iWidget. The iWidget microformat service produces an HTML microformat as specified in an iWidget specification.

In further embodiments, a live text parser on the client system detects the iWidget microformat in the markup of a portal page upon receiving the markup on the client system and invokes a registered handler that is responsible for processing iWidget microformats. The registered handler instantiates an iWidget representing a corresponding portlet, registers the portlet with an iWidget runtime, and initializes the created portlet iWidget by requesting a corresponding iWidget definition from an iWidget definition service on the portal server. The iWidget definition service generates a definition for a given portlet by analyzing the portlet deployment descriptor and maps found information to a corresponding iWidget.

In further embodiments, the portlet iWidget calls a client-side WSRP consumer to request the portlet markup from the portal server. The client-side WSRP consumer interprets a response received from the portal server, and the client-side WSRP consumer retrieves the portlet markups from the response message, parses the markup for rewriting purpose, and passes a processed markup back to the portlet iWidget to get displayed by the browser specific environment.

In another embodiment, a data processing program for execution in a data processing system comprises software code portions for performing a method for rendering components within different browser environments when the program is run on the data processing system.

In yet another embodiment, a computer program product stored on a computer-usable medium, comprises computer-readable program means for causing a computer to perform a method for rendering components within different browser environments when the program is run on the computer.

Embodiments support rendering on server and client side at the same time and therefore exploits the best capabilities available.

In an embodiment the packaging of portlets is extended to include an implementation for the client side, i.e. an iWidget, and another implementation for the server side, i.e. a portlet, and additional other alternative implementations (e.g., Flex, Open Social).

Embodiments employ a portal server communicating with the client browser and negotiating the capabilities that the client browser has available. The portal server also determines the proper rendering mode of the page that should be displayed. Further the portal server determines the different implementations of the components, which are packaged and/or provided. Based on this, the client server chooses the component implementation and rendering mode which suits it best, e.g. based on a table which maps capabilities to selected choices.

An embodiment for address translation may be implemented as an entirely software embodiment, or an embodiment containing both hardware and software elements. Embodiments may be implemented in software, which includes but is not limited to firmware, resident software, microcode, etc.

Furthermore, embodiments may take the form of a computer program product accessible from a computer-usable or computer-readable medium providing program code for use by or in connection with a computer or any instruction execution system. For the purposes of this description, a computer-usable or computer-readable medium may be any apparatus that contains, stores, communicates, propagates, or transports the program for use by or in connection with the instruction execution system, apparatus, or device.

The computer readable medium may be an electronic, magnetic, optical, electromagnetic, infrared, or semiconductor system (or apparatus or device) or a propagation medium. Examples include computer readable storage medium such as a semiconductor or solid state memory, magnetic tape, a removable computer diskette, a random access memory (RAM), a read-only memory (ROM), a rigid magnetic disc, and an optical disc. Current examples of optical discs include Compact Disc—read only memory (CD-ROM), Compact Disc—read/write (CD-R/W), DVD, etc. A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and ethernet cards are just a few of the currently available types of network adapters.

The invention claimed is:

1. A computer-implemented method for rendering components within different browser environments, the method comprising:
   receiving a request for a portal page from a client system;
   communicating with a browser specific environment of the client system to determine capabilities that the browser specific environment has available;
   aggregating, by a computer, said portal page;
   selecting a rendering mode based on the capabilities of the browser specific environment, wherein said rendering mode is one of a server side rendering and a client side rendering;
   based on the rendering mode being the client side rendering, rendering the portal page to produce a page skeleton markup containing sections that are filled by said client system through separate requests; and
   transmitting to said client system the portal page.

2. The method according to claim 1, wherein said browser environments comprise at least one of:
   hypertext markup language (HTML);
   Open Social®;
   iWidgets®; and
   Flex.

3. The method according to claim 1, wherein said browser specific markup comprises at least one of:
   HTML;
   JavaScript;
   extensible markup language (XML); and
   Flex.

4. The method according to claim 1, based on the rendering mode being the server side rendering, rendering the portal page to produce a complete markup representation of the portal page including said browser specific markup.

5. A system for rendering components within different browser environments, the system comprising a portal server computer, the system configured to:
   receive a request for a portal page from a client system;
   communicate with a browser specific environment of the client system to determine capabilities that the browser specific environment has available;
   aggregate said portal page by said portal server computer;
   select a rendering mode on the capabilities of the browser specific environment, wherein said rendering mode is one of a server side rendering and a client side rendering; and
   based on the rendering mode being the client side rendering, render the portal page to produce a page skeleton markup containing sections that are filled by said client system through separate requests;
   transmit to said client system the portal page.

6. The system according to claim 5, wherein said browser environments comprise at least one of:
   hypertext markup language (HTML);
   Open Social®;
   iWidgets®; and
   Flex.

7. The system according to claim 5, wherein said browser specific markup comprises at least one of:
HTML;
JavaScript;
extensible markup language (XML); and
Flex.

8. The system according to claim 5, based on the rendering mode being the server side rendering, rendering the portal page to produce a complete markup representation of the portal page including said browser specific markup.

9. A computer program product for rendering components within different browser environments, the computer program product comprising:
a non-transitory computer readable storage medium having computer readable program code embodied therewith, the computer readable program code comprising:
computer readable program code configured to:
receive a request for a portal page from a client system;
communicate with a browser specific environment of the client system to determine capabilities that the browser specific environment has available;
aggregate said portal page;
select a rendering mode based on the capabilities of the browser specific environment, wherein said rendering mode is one of a server side rendering and a client side rendering; and
based on the rendering mode being the client side rendering, render the portal page to produce a page skeleton markup containing sections that are filled by said client system through separate requests;
transmit to said client system the portal page.

10. The computer program product according to claim 9, wherein said browser environments comprise at least one of:
hypertext markup language (HTML);
Open Social®;
iWidgets®; and
Flex 11. The computer program product according to claim 9, wherein said browser specific markup comprises at least one of:
HTML;
JavaScript;
extensible markup language (XML); and
Flex.

12. The computer program product according to claim 9, based on the rendering mode being the server side rendering, rendering the portal page to produce a complete markup representation of the portal page including said browser specific markup.

* * * * *